US010301771B2

(12) United States Patent
Barth et al.

(10) Patent No.: US 10,301,771 B2
(45) Date of Patent: May 28, 2019

(54) COATED FABRIC PRODUCTS

(71) Applicant: Dow Corning Corporation, Midland, MI (US)

(72) Inventors: Marita Barth, Ingelheim (DE); William Blackwood, Midland, MI (US); Vittorio Clerici, Oestrich-Winkel (DE); Andrew William Mountney, Warwick (GB)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 15/911,505

(22) Filed: Mar. 5, 2018

(65) Prior Publication Data

US 2018/0195232 A1    Jul. 12, 2018

Related U.S. Application Data

(63) Continuation of application No. 13/509,382, filed as application No. PCT/US2010/056503 on Nov. 12, 2010, now Pat. No. 9,932,706.

(60) Provisional application No. 61/260,526, filed on Nov. 12, 2009.

(51) Int. Cl.
| | |
|---|---|
| *B60R 21/235* | (2006.01) |
| *D06N 3/00* | (2006.01) |
| *C10M 173/02* | (2006.01) |
| *D06N 3/04* | (2006.01) |
| *D06N 3/14* | (2006.01) |
| *D06N 3/18* | (2006.01) |

(52) U.S. Cl.
CPC ......... *D06N 3/0056* (2013.01); *B60R 21/235* (2013.01); *C10M 173/02* (2013.01); *D06N 3/0063* (2013.01); *D06N 3/047* (2013.01); *D06N 3/144* (2013.01); *D06N 3/183* (2013.01); *B60R 2021/23514* (2013.01); *C10M 2201/062* (2013.01); *C10M 2201/102* (2013.01); *C10M 2209/104* (2013.01); *C10M 2213/062* (2013.01); *C10M 2217/045* (2013.01); *C10M 2229/04* (2013.01); *C10M 2229/047* (2013.01); *C10N 2250/121* (2013.01); *C10N 2270/00* (2013.01)

(58) Field of Classification Search
CPC ...... C10M 2201/062; C10M 2209/104; C10M 2209/108; C10M 173/02; C10M 2201/102; C10M 2213/062; C10M 2217/045; C10M 2229/04; C10M 2229/047; C10N 2210/03; C10N 2250/121; C10N 2270/00; B60R 2021/23514; B60R 21/235; D06N 3/0056; D06N 3/0063; D06N 3/047; D06N 3/144; D06N 3/183
See application file for complete search history.

(56) References Cited

U.S. PATENT DOCUMENTS

| | | | |
|---|---|---|---|
| 3,434,998 A | 3/1969 | Aldrich et al. | |
| 3,455,877 A | 7/1969 | Plueddemann | |
| 3,924,047 A | 12/1975 | Ward, Jr. et al. | |
| 3,927,241 A | 12/1975 | Augustin | |
| 4,284,682 A | 8/1981 | Frosch et al. | |
| 4,787,991 A | 11/1988 | Morozumi et al. | |
| 5,110,666 A | 5/1992 | Menzel et al. | |
| 5,258,211 A | 11/1993 | Momii et al. | |
| 5,427,698 A | 6/1995 | Hirokawa et al. | |
| 5,789,084 A | 8/1998 | Nakamura et al. | |
| 5,877,256 A | 3/1999 | Nakamura et al. | |
| 5,945,185 A | 8/1999 | Hirai et al. | |
| 6,169,043 B1 | 1/2001 | Li | |
| 6,177,365 B1 | 1/2001 | Li | |
| 6,177,366 B1 | 1/2001 | Li | |
| 6,239,046 B1 | 5/2001 | Veiga et al. | |
| 6,245,695 B1 | 6/2001 | Maruo et al. | |
| 6,268,300 B1 | 7/2001 | Hernandez et al. | |
| 6,350,709 B1 | 2/2002 | Veiga | |
| 6,355,343 B1 | 3/2002 | Glassock | |
| 6,425,600 B1 | 7/2002 | Fujiki et al. | |
| 6,458,724 B1 | 10/2002 | Veiga et al. | |
| 6,511,754 B1 | 1/2003 | Bohin et al. | |
| 6,534,126 B1 | 3/2003 | Blackwood et al. | |
| 6,709,752 B1 | 3/2004 | James et al. | |
| 7,198,854 B2 | 4/2007 | Dumont et al. | |
| 7,309,528 B2 | 12/2007 | Clerici et al. | |
| 7,524,797 B1 | 4/2009 | Perez, Jr. et al. | |
| 7,543,843 B2 | 6/2009 | Keshavaraj et al. | |
| 7,737,059 B1 | 6/2010 | Keshavaraj | |
| 7,947,865 B2 | 5/2011 | Fossum et al. | |
| 2002/0017779 A1 | 2/2002 | Gilpatrick et al. | |
| 2003/0027474 A1 | 2/2003 | Hayes | |
| 2003/0194934 A1 | 10/2003 | Newbill | |
| 2003/0198767 A1 | 10/2003 | Breed et al. | |
| 2005/0059765 A1 | 3/2005 | Finch et al. | |
| 2005/0218640 A1 | 10/2005 | Kokeguchi | |
| 2006/0014456 A1 | 1/2006 | Li | |

(Continued)

FOREIGN PATENT DOCUMENTS

| | | |
|---|---|---|
| CN | 101122093 A | 2/2008 |
| CN | 101443512 A | 5/2009 |

(Continued)

OTHER PUBLICATIONS

Carraher, C.E. et al., "Inorganic Polymers", Ullmann's Encyclopedia of Industrial Chemistry, vol. 19, 2009, pp. 221-262.

(Continued)

*Primary Examiner* — Arti Singh-Pandey
(74) *Attorney, Agent, or Firm* — Howard & Howard Attorneys PLLC

(57) ABSTRACT

This relates to the coating of air bags, which are used for safety purposes to protect occupants of vehicles such as automobiles, and of air bag fabrics intended to be made into air bags. In particular the invention relates to the top coating of air bags and air bag fabrics which have been pre-coated with a cured organic resin coating composition. The top-coat is an anti-blocking coating composition comprising at least one solid lubricant dispersed in an organic polymer binder. A process for applying the top-coat is also described.

11 Claims, No Drawings

(56) References Cited

U.S. PATENT DOCUMENTS

| | | |
|---|---|---|
| 2006/0217016 A1 | 9/2006 | Lin et al. |
| 2006/0276585 A1 | 12/2006 | Lork |
| 2007/0015425 A1 | 1/2007 | Hill et al. |
| 2008/0007029 A1 | 1/2008 | Keshavaraj et al. |
| 2008/0036183 A1 | 2/2008 | Keshavaraj et al. |
| 2008/0054547 A1 | 3/2008 | Oki |
| 2009/0186543 A1 | 7/2009 | Keshavaraj et al. |
| 2009/0298367 A1 | 12/2009 | Lafaysse et al. |
| 2010/0095515 A1 | 4/2010 | Kira et al. |
| 2010/0190395 A1 | 7/2010 | Nozoe et al. |
| 2010/0190396 A1 | 7/2010 | Nozoe et al. |
| 2010/0297903 A1 | 11/2010 | Thiria et al. |
| 2012/0225228 A1 | 9/2012 | Barth et al. |
| 2012/0280479 A1 | 11/2012 | Barth et al. |
| 2012/0288649 A1 | 11/2012 | Blackwood et al. |
| 2015/0267344 A1 | 9/2015 | Blackwood et al. |

FOREIGN PATENT DOCUMENTS

| | | |
|---|---|---|
| EP | 0617118 A1 | 9/1994 |
| EP | 0712956 A1 | 5/1996 |
| EP | 0953675 A2 | 11/1999 |
| EP | 1205595 A2 | 5/2002 |
| EP | 1595935 A2 | 11/2005 |
| EP | 1595938 A1 | 11/2005 |
| EP | 1887060 A1 | 2/2008 |
| JP | 2000191915 A | 7/2000 |
| JP | 2002520183 A | 7/2002 |
| JP | 2003502522 A | 1/2003 |
| JP | 2004534684 A | 11/2004 |
| JP | 2007501081 A | 1/2007 |
| JP | 2007526400 A | 9/2007 |
| JP | 2009190171 A | 8/2009 |
| WO | 2004070102 A2 | 8/2004 |
| WO | 2007071631 A1 | 6/2007 |
| WO | 2008020605 A1 | 2/2008 |
| WO | 2008020635 A1 | 2/2008 |
| WO | 2008111222 A1 | 9/2008 |
| WO | 2011060238 A1 | 5/2011 |
| WO | 2011060245 A1 | 5/2011 |

OTHER PUBLICATIONS

Dow Corning,. "Silicone vs. Organic Polymers", 2016, extracted from http://www.dowcorning.com/content/discover/discoverchem/si-vs-organic.aspx on May 23, 2016, 2 pages.

English language abstract and machine-assisted English translation for CN 101122093 extracted from the espacenet.com database on Oct. 28, 2013, 35 pages.

English language abstract and machine-assisted English translation for CN 101443512 extracted from the espacenet.com database on Oct. 28, 2013, 40 pages.

English language abstract and machine-assisted English translation for JP 2002-520183 extracted from the PAJ database on Dec. 7, 2015, 27 pages.

English language abstract and machine-assisted English translation for JP 2003-502522 extracted from the PAJ database on Dec. 7, 2015, 14 pages.

English language abstract and machine-assisted English translation for JP 2007-501081 extracted from the PAJ database on Dec. 7, 2015, 32 pages.

English language abstract and machine-assisted English translation for JP 2009-190171 extracted from the PAJ database on Dec. 7, 2015, 15 pages.

English language abstract and translation for EP 1595938 extracted from the espacenet.com database on Aug. 15, 2012, 10 pages.

English language abstract for JP 2004-534684 extracted from espacenet.com database on Sep. 23, 2015, 2 pages.

English language abstract for WO 2007/071631 extracted from the espacenet.com database on Aug. 15, 2012, 38 pages.

English language abstract for WO 2008/020605 extracted from the espacenet.com database on Aug. 15, 2012, 26 pages.

English language abstract for WO 2008/020635 extracted from the espacenet.com database on Aug. 15, 2012, 28 pages.

English language abstract for WO 2008/111222 extracted from espacenet.com database on Dec. 7, 2015, 2 pages.

International Search Report for Application No. PCT/US2010/056489 dated Apr. 20, 2011, 5 pages.

International Search Report for Application No. PCT/US2010/056503 dated Apr. 20, 2011, 5 pages.

Moretto, H.-H. et al., "Silicones", Ullmann's Encyclopedia of Industrial Chemistry, vol. 32, 2000, pp. 675-712.

Noll, W., "Chemistry and Technology of Silicones". Academic Press, New York, 1968, Chapter 1, pp. 1-23.

Parello, S., "Silicone vs. Polyurethane Sealant", PCM Services, 2013, extracted from http://www.pcmservices.com/blog/2013/06/12/building_caulking_silicone_polyurethane_sealant/ on May 23, 2016. 3 pages.

Polymer Science Learning Center, "Inorganic Polymers". 2005, extracted from http://pslc.ws/macrog/inorg.htm on May 23, 2016. 5 pages.

Shin-Etsu Silicone, "Features attributable to siloxane bonds", 2016, extracted from http://www.shinetsusilicone-global.com/info/begin4.shtml. 1 page.

Wacker Chemie AG, "Silicone Rubber from Wacker", 2016, extracted from http://www.wacker.com/cms/en/products/product_groups/silicone_rubbers.jsp. 2 pages.

Wacker, "Silicone Resins", www.wacker.com/cms/en/products_groups/silicone_resins.jsp, 2016, 3 pages.

Wikipedia, "Silicone Oil", www.en.wikipedia.org/wiki/silicone_oil, 2016, 2 pages.

English language abstract for JP 2000-191915 extracted from espacenet.com database on Aug. 20, 2018, 2 pages.

English language abstract for JP 2007-526400 extracted from espacenet.com database on Aug. 20, 2018, 1 page.

COATED FABRIC PRODUCTS

CROSS-REFERENCE TO RELATED APPLICATIONS

This application is a continuation of U.S. patent application Ser. No. 13/509,382, filed on Jul. 25, 2012, now U.S. Pat. No. 9,932,706, which is the National Stage of International Patent Application No. PCT/US2010/056503, filed on Nov. 12, 2010, which claims the benefit of U.S. Provisional Patent Application No. 61/260,526, filed on Nov. 12, 2009, the contents of which are incorporated herein by reference.

BACKGROUND OF THE INVENTION

This invention relates to the coating of air bags, which are used for safety purposes to protect occupants of vehicles such as automobiles, and of air bag fabrics intended to be made into air bags. In particular the invention relates to the top coating with an anti-blocking composition of air bags and air bag fabrics which have been coated with a composition comprising an organic resin. By an 'organic resin' or 'organic polymer' we mean a polymer in which at least 50% of the atoms forming the polymer chain are carbon atoms.

Air bags are generally formed from a woven or knitted fabric made of synthetic fibre, for example of polyamide such as nylon-6,6 or polyester, covered on at least one of its sides with a layer of an elastomer. Air bags may be made of flat fabric pieces which are coated and then sewn together to provide sufficient mechanical strength, or may be woven in one piece with integrally woven seams. Sewn air bags are generally assembled with the coated fabric surface at the inside of the air bag. One piece woven air bags are coated on the outside of the air bag.

For some airbag applications, pressurised gas has to be retained in a fabric envelope for a relatively long period. This requirement exists for example in side curtain airbags for the automotive industry. These side curtain airbags are intended to inflate at the time of impact, as do conventional airbags. The side curtains unfold to form a cushioned curtain between passengers and some of the side of the car body, e.g., the windows. As the intention is not merely to cushion the blow on impact itself, as is the case for conventional driver and passenger airbags, but to protect passengers e.g. when a car is rolling, it is important that the side curtain air bag is sufficiently pressurised during such rolling process. Where conventional driver and passenger airbags only need to retain pressure for a fraction of a second, it is desirable that side curtain airbags maintain a suitable pressure for a few seconds. Similar applications exist where a pressurised fabric structure is desired to maintain a certain gas pressure for a relatively extended period of time, e.g. in emergency chutes for aeroplanes, or inflatable rafts. There is thus a demand for coated fabrics having the benefits of flexibility and high temperature resistance at low coating weight given by silicone rubber coatings, but with improved air tightness.

Among preferred elastomers for coating the air bag or air bag fabric are urethane polymers.

U.S. Pat. No. 5,110,666 describes a fabric substrate which is coated with a novel polycarbonate-polyether polyurethane for use as a driver's side or passenger side air bag.

U.S. Pat. No. 6,169,043 describes airbag coating compositions comprising a mix of polyurethane and polyacrylate constituents to provide a low permeability coating on a fabric surface.

U.S. Pat. No. 7,543,843 describes the use of hybrid resins as airbag coatings. The hybrid resins are urethanes blended with acrylates, vinyls, and/or silicones, where at least one of the components has a glass transition temperature of 20° C. or less. The urethanes are preferably of the polycarbonate, polytetramethyleneglycol, silicon-based diol, or olefin-based diol type.

If a urethane polymer base coat is left as the only coating on the air bag, the surface properties of this base coat would result in blocking (the urethane polymer coated surfaces sticking to each other during storage and tight packing of the air bag in the automobile, particularly at high ambient temperatures) and very high stresses when the airbag is inflated which would result in bag failure by tearing during inflation or by delamination of the urethane polymer base coat from the fabric. Blocking between urethane polymer surfaces is also a problem during manufacture of air bags when fabric coated with urethane polymer is stored in a roll.

U.S. Pat. No. 5,945,185 describes an air bag made of silicone modified thermoplastic polyurethane resin in which the content of siloxane is 5-40% by weight. Such an air bag is claimed to have reduced danger of blocking, but vehicle manufacturers have preferred to use coated fabric air bags.

U.S. Pat. No. 6,239,046 describes coating a knit, woven, or non-woven textile substrate with an adhesive polyurethane layer and then with an elastomeric polysiloxane layer. An air curtain or air bag with superior air-holding and superior heat resistance is then formed from the coated textile substrate.

U.S. Pat. Nos. 6,177,365 and 6,177,366 describe airbag coatings comprising at least two separate layers. The first layer (base coat), in contact with the airbag surface, comprises a non-silicone composition of polyurethane, polyacrylate, polyamide, butyl rubber, hydrogenated nitrile rubber or ethylene vinyl acetate copolymer. The second layer (topcoat) is a silicone material.

Moreover, it has been found that the application of a curable liquid silicone rubber top coat over certain organic resin base coats, particularly urethane polymer base coats or base coats cured with an amino resin, releases a displeasing fishy smell.

BRIEF SUMMARY OF THE INVENTION

According to one aspect of the present invention, an air bag coated with an organic resin is top coated with an anti-blocking coating comprising at least one solid lubricant dispersed in an organic polymer binder.

According to another aspect of the invention, a process for coating an air bag or air bag fabric in which the bag or fabric is coated with an organic resin is characterized in that the air bag is top coated with an anti-blocking coating composition comprising an aqueous dispersion of at least one dispersed solid lubricant.

DETAILED DESCRIPTION OF THE INVENTION

The solid lubricant present in the anti-blocking coating can for example comprise a fluoropolymer such as polytetrafluoroethylene (PTFE), a solid hydrocarbon wax such as a polyolefin wax, for example micronised polypropylene wax, or a mixture of PTFE and wax. The solid lubricant can additionally or alternatively comprise a lubricant mineral such as talc, which may be in the form of talc microspheres, montmorillonite, molybdenum disulphide, graphite, zinc sulfide or tricalcium phosphate, or a mixture of any two or more of these. Mineral lubricants such as talc and montmorillonite are effective in reducing blocking at the air bag surfaces, and can be used to partly or totally replace the PTFE as solid lubricant.

We have found that a combination of fluoropolymer and talc is particularly effective at reducing blocking of coated air bag surfaces.

The solid lubricant anti-blocking coating composition is preferably applied to the air bag or air bag fabric in each instance pre-coated with a composition comprising an organic resin from an aqueous dispersion. The coating composition generally requires a binder to enhance the adhesion of the solid lubricant to the air bag fabric. The binder can for example be an organic polymer binder. Preferred organic polymer binders include polyurethanes, phenolic resins, epoxy resins, acrylic resins, polyester resins, amino-formaldehyde resins, vinyl resins, for example polyvinyl butyral, and polyamideimide resins. Preferred polyurethanes include copolymers of a polyester polyol and an aromatic or aliphatic diisocyanate. Preferred phenolic resins include copolymers of phenol and formaldehyde and copolymers of phenol, formaldehyde and cresol. A preferred epoxy resin is copolymer of bisphenol A and epichlorohydrin. The coating present on the air bag fabric surface thus comprises a solid lubricant dispersed in an organic polymer binder. The level of organic polymer binder can for example be in the range 2 or 3% up to 50% by weight of the anti-blocking coating composition (on a dry coat weight basis) i.e. 2 to 50% or alternatively 3 to 50% by weight of the antifriction coating composition on a dry coat weight basis. Levels of organic polymer binder of for example 5 or 10% up to 35% i.e. 5 to 35% or alternatively 10 to 35% by weight of the coating composition by weight of the coating composition (on a dry coat weight basis). are often preferred. The total weight % of the composition always adds up to 100%. Reference to ranges in the composition on a dry coat weight basis is intended to mean the weight calculated to exclude the weight of the water and or co-solvent.

In one preferred aspect of the invention the anti-blocking coating composition applied to the air bag fabric, previously coated with a composition comprising an organic resin, comprises an aqueous dispersion of a solid lubricant, such as a fluoropolymer and/or talc or montmorillonite, in a dispersion of an organic polymer binder. The dispersion of organic polymer binder can be an aqueous solution, optionally containing a water-miscible organic co-solvent if required, or can be an aqueous emulsion or suspension. Such an emulsion or suspension is generally stabilized by at least one surfactant, which can be selected from non-ionic, anionic, cationic and amphoteric surfactants and mixtures of two or more of these. An example of a suitable non-ionic surfactant is an alkyl ethoxylate (ethoxylated fatty alcohol) or an aralkyl ethoxylate such as (t-Octylphenoxy)polyethoxyethanol. An example of a suitable anionic surfactant is sodium dodecylbenzenesulfonate.

The anti-blocking coating can be prepared by dispersing the solid lubricant in a dispersion of an organic polymer binder, or by mixing a dispersion of solid lubricant with a dispersion of an organic polymer binder, or by dispersing an organic polymer binder in a dispersion of solid lubricant. Combinations of these techniques can be used; for example a dispersion of a fluoropolymer solid lubricant can be mixed with a dispersion of an organic polymer binder and a mineral solid lubricant such as talc can be mixed into the resulting dispersion.

The anti-blocking coating composition preferably contains at least 3 or 5%, more preferably at least 10%, up to 90%, more preferably up to 80% by weight of the solid lubricant on a dry weight basis e.g. from 3 to 90% alternatively from 3 to 80% alternatively from 5 to 90% alternatively from 5 to 80%, alternatively from 10 to 90% alternatively from 10 to 80% by weight of the solid lubricant. Examples include compositions containing 50% or 60% solid lubricant on a dry weight composition. Most preferably the anti-blocking coating on the fabric comprises at least 20 or 30% up to 75 or 85% by weight solid lubricant. The organic polymer binder can for example comprise 3 to 50% of the coating on a dry weight basis. The total weight of the composition being 100%.

The amount of solid mineral lubricant such as talc is preferably not so high as to cause substantial settling of the talc during storage. The amount of talc present in a coating containing or not containing PTFE solid lubricant is preferably in the range from 5 or 10% up to 30 or 40% for example 5% to 30%, alternatively 5% to 40%, alternatively 10% to 30% or alternatively 10% to 40% when present in combination with PTFE solid lubricant or up to 80 or 90% in the absence of PTFE solid lubricant for example 5% to 90%, alternatively 5% to 80%, alternatively 10% to 90%, alternatively 10% to 80%, by weight of the coating on a dry weight basis. The use of talc in an anti-blocking coating according to the present invention avoids problems associated with dust control when talc is applied as a powder to air bags to inhibit blocking.

The anti-blocking coating composition may contain an adhesion promoter to improve adhesion of the coating to the cured organic resin base coat. Preferred adhesion promoters include epoxysilane, for example an epoxyalkyltrialkoxysilane such as 3-glycidoxypropyltrimethoxysilane, (alk)acryl oxyalkyltrialkoxy silanes such as methacryloxypropyltrimethoxysilane or aminosilanes such as (ethylenediaminepropyl) trimethoxysilane N-(2-aminoethyl)-3-aminopropyltrimethoxysilane aminoalkylalkoxysilanes, N-phenylaminomethyldimethoxymethylsilane, N-cyclohexyl-aminomethyldimethoxymethylsilane, N-methylaminomethyl-dimethoxymethylsilane, N-ethylaminomethyl-dimethoxy-methylsilane, N-propylaminomethyldimethoxymethylsilane, N-butylaminomethyldimethoxymethylsilane, (methacryloyl-oxymethyl)-dimethoxymethylsilane, N-(dimethoxymethyl-silylmethyl)-O-methylcarbamate, the products from the Michael like addition reaction of aminomethyldimethoxymethylsilane with Michael acceptors such as maleic diesters, fumaric diesters, citraconic diesters, acrylic esters, methacrylic esters, cinnamic esters, itaconic diesters, vinylphosphonic diesters, vinylsulfonic aryl esters, vinyl sulfones, vinyl nitriles, 1-nitroethylenes or Knoevenagel condensation products such as those, for example, of malonic diesters and aldehydes such as formaldehyde, acetaldehyde or benzaldehyde. Organosilicon compounds having epoxy and alkoxy functionalities, for example as described in U.S. Pat. No. 3,455,877 (incorporated by reference) may also be used. The alkoxy radicals may be the same or different and are usually selected from alkoxy radicals having from 1 to 4 carbon atoms, for example, methoxy or ethoxy. Any other substituents, when present, are preferably selected from alkyl groups having from 1 to 8 carbon atoms. Suitable silanes include e.g. ϑ-(3,4 epoxycyclohexyl)-ethyltrimethoxysilane.

The adhesion promoter is preferably present in the coating composition at up to 5% by weight in the formulation, for example from 0.2% or 0.5% up to 1%.

The anti-blocking coating composition may contain a wetting agent to ensure that the coating will spread on the cured on the organic resin base coat. One type of preferred wetting agent is a siloxane polyether, particularly a polyoxyethylene-siloxane in which the polyether group is hydroxyl-terminated, otherwise known as a silicone glycol. Such wetting agents include siloxane compounds which contain an alkylpoly(ethylenexoy) siloxane group associated with an alkyl siloxane group, where the alkyl group contains 1-6 carbon atoms. They are preferably compounds of low molecular weight, preferably containing between 2 and 8 silicon atoms. For example, the wetting agents may contain 1-3 alkylpoly(ethyleneoxy)siloxane groups (i) and 1 to 4 alkyl-siloxane groups (ii). Alternatively the wetting agents may be a trisiloxane containing one alkylypoly(ethyleneoxy)siloxane group (i) and two alkyl (typically methyl- and/or ethyl)-siloxane groups (ii). Preferably, the average number of ethyleneoxy (EO) units in the alkylpoly(ethyleneoxy) siloxane group (ii) is between 5 and 12 inclusive. Preferably, the end unit of the alkylpoly(ethyleneoxy) siloxane group (ii) is an acetoxy, hydroxyl or alkoxy unit (e.g. methoxy). For example compounds of the following structure:

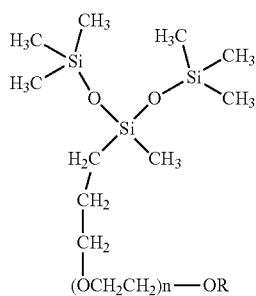

Where:
n=3-20
R=H, $CH_3$, $CH_3CH_2$, $CH_3CO$

Other R groups can be used and the length of the alkyl chain between the Si Atom and the EO chain may vary from 1 to 12 carbons, for example 3 carbon atoms thereby forming a propyl link between the Si atom and the EO chain. Preferred examples include but are not limited to 1,1,1,3,5,5,5-heptamethyl-3-polyethoxypropyl-trisiloxane and. The wetting agent is preferably present in the coating composition at up to 10% by weight in the formulation, for example from 0.5% or 1% up to 3%.

The anti-blocking coating composition may contain a flame retardant. It is important that air bags do not support burning, and the air bag generally requires addition of a flame retardant in order to pass the stringent flammability tests applicable to air bags, particularly if the base coat is an organic resin rather than a silicone. The flame retardant may be most effective if it is in the top coat. An example of a preferred flame retardant is aluminum trihydrate, which preferably has not been surface treated. The anti-blocking coating composition can for example contain 5 to 40% by weight aluminum trihydrate. The coating on the fabric can for example contain 5 to 55% aluminum trihydrate on a dry coat weight basis.

If the anti-blocking coating composition contains a mineral lubricant such as talc, it may contain a thickener to inhibit settling of the talc. The thickener can for example be fumed silica, bentonite clay, or a polymeric thickener such as polyvinyl alcohol. The thickener is preferably present in the coating composition at up to 5% by weight in the formulation, for example from 0.2% or 0.5% up to 1% based on a dry coat weight basis.

The anti-blocking coating can be applied to the coated air bag or coated air bag fabric by roller application, for example gravure, offset roller or lick roller, or by curtain coating, or by spray, which may be air assisted or airless spraying, or by knife over roller. Roller application is often preferred as an effective method to coat uniformly at low coating weights. The amount of coating composition transferred to the fabric is a function of pressure on the roller and/or etched surface depth in the gravure. The anti-blocking coating is preferably applied at a coating weight of 1 $g/m^2$ up to 10 or 15 $g/m^2$ on a dry coat weight basis onto the cured organic resin base coat. We have found that coating weights as low as 1 or 2 $g/m^2$ are effective to prevent blocking.

The amount of aqueous diluent (water plus any cosolvent mixed with the water) in the anti-blocking coating composition can be controlled in accordance with the required viscosity for coating and the required coating weight. Usually the coating composition has a solids content of 20 to 75% by weight and comprises 80 to 25% aqueous diluent with the total weight being 100%.

The organic resin composition which is applied to the air bag or air bag fabric as a base coat can in general be any of the organic resin based coatings described in the aforementioned patents. One preferred type of organic resin is a polyurethane. A polyurethane base coat can be a reactive polyurethane which is cured on the fabric, for example by reaction of isocyanate groups with hydroxyl or amine groups or can be a thermoplastic polyurethane. Whether curable or thermoplastic, the polyurethane is generally the reaction product of a polyol with a polyisocyanate. The polyol can for example be a polyether diol such as a polytetramethyleneglycol diol, a polyester-polyetherdiol, a polycarbonate-polyether diol, a silicone-polyether diol, or a polyacrylate containing pendant hydroxyl groups. The polyisocyanate can be an aromatic diisocyanate but is preferably an aliphatic or cycloaliphatic diisocyanate. The organic resin base coat can be a hybrid urethane resin comprising polyurethane blended with acrylates, vinyls, and/or silicones as described in U.S. Pat. No. 7,543,843. Although such an organic resin base coat has given odour problems when overcoated with various top coats, we have found that it can be overcoated with an anti-blocking coating according to this invention without any odour problem.

The base coat can alternatively comprise a polyacrylate, for example a curable polyacrylate containing pendant hydroxyl groups that can be cured by an amino resin such as a melamine-formaldehyde resin, or an ethylene vinyl acetate copolymer. The base coat can be a blend of organic resins, for example a blend of a polyurethane with a polyacrylate or with an ethylene vinyl acetate copolymer.

If the organic resin base coat is curable, it is generally cured before application of the anti-blocking coating, although in an alternative process the anti-blocking coating composition can be applied to uncured organic resin base coat and the combination of the organic resin base coat composition and the anti-blocking coating composition can be heat cured.

When the anti-blocking coating is applied to a cured organic resin base coat, the antifriction coating can be cured at ambient temperature or can be cured more rapidly at elevated temperature, for example in the range 50 to 200° C., particularly 100 to 150° C. One possible method of curing at elevated temperature comprises applying the anti-blocking coating composition to a heated substrate, for example to a coated air bag or air bag fabric immediately after heat curing the organic resin base coat.

The anti-blocking coatings of the invention inhibit blocking of the coated fabric surfaces, that is sticking of the coated surfaces to each other during storage or tight packing in the air bag compartment of a vehicle. Such blocking can cause very high stresses when the airbag is inflated, resulting in bag failure by tearing or by delamination of the silicone base coat from the fabric. The anti-blocking coatings may also reduce friction at the coated air bag surface and thus reduce wear of the air bag when it is subjected to movement when a vehicle is in use; such wear may result in reduced pressure retention of the air bag.

Use of the anti-blocking coatings of the invention as an air bag top coat does not give rise to any displeasing smell. We have found that when the anti-blocking coatings of the invention are applied over a urethane polymer base coat, for example a hybrid urethane resin comprising urethane polymer blended with acrylates, vinyls, and/or silicones as described in U.S. Pat. No. 7,543,843, no fishy or ammoniacal smell is released.

The anti-blocking coatings of the invention inhibit blocking and avoid the displeasing smell without any deleterious effect on air bag permeability or appearance. The anti-blocking coatings may have some effect in increasing the sealing of the air bag against loss of air pressure, particularly when the coating weight of anti-blocking coating is above 5 g/m². The anti-blocking coatings do not cause any colour change due to interaction with the base coat.

Preferably the airbags described herein are particularly useful in airbag applications, in which pressurised gas has to be retained in a fabric envelope for a relatively long period e.g. >5 seconds or above, particularly in side curtain airbags for the automotive industry. These side curtain airbags are intended to inflate at the time of impact, as do conventional airbags. The side curtains unfold to form a cushioned curtain between passengers and some of the side of the car body, e.g., the windows. As the intention is not merely to cushion the blow on impact itself, as is the case for conventional driver and passenger airbags, but to protect passengers e.g. when a car is rolling, it is important that the side curtain air bag is sufficiently pressurised during such rolling process. Where conventional driver and passenger airbags only need to retain pressure for a fraction of a second, it is desirable that side curtain airbags maintain a suitable pressure for a few seconds. Similar applications exist where a pressurised fabric structure is desired to maintain a certain gas pressure for a relatively extended period of time, e.g. in emergency chutes for aeroplanes, or inflatable rafts. There is thus a demand for coated fabrics having the benefits of flexibility and high temperature resistance at low coating weight given by silicone rubber coatings, but with improved air tightness.

The invention is illustrated by the following Examples, in which parts and percentages are by weight unless otherwise stated.

Example 1

An aqueous aliphatic polyurethane dispersion stabilized by non-ionic surfactant was mixed with an aqueous dispersion of PTFE powder stabilized by non-ionic surfactant, and then with talc, aluminum trihydrate, a wetting agent and an adhesion promoter to form an anti-blocking coating composition comprising 50 parts water, 44 parts PTFE, 3.0 parts urethane polymer, 3.0 parts (t-Octylphenoxy)polyethoxyethanol non-ionic surfactant, 2.0 parts 1,1,1,3,5,5,5-heptamethyl-3-polyethoxypropyl-trisiloxane wetting agent, 1.0 part epoxysilane adhesion promoter, 10 parts talc and 20 parts aluminum trihydrate.

The anti-blocking coating composition of Example 1 was applied by gravure roller coating to the coated surface of a woven nylon air bag fabric coated with a coating sold by Milliken & Co. of Spartanburg, S.C., under the trade mark Patina and believed to comprise a hybrid urethane resin comprising urethane polymer blended with an ethylene vinyl acetate copolymer and cured. The anti-blocking coating was heat cured at 140° C. In different experiments, the anti-blocking coating was applied at various coat weights as shown in Table 1.

The fabrics top coated with the anti-blocking coating of Example 1, and three control samples having no top coat, were tested in a blocking test in which 50 mm×50 mm coated fabrics were placed face to face and a 20 lb (9 kg) weight was applied while the fabrics were held at 110° C. for 4 hours. At the end of that period, a 50 g force is applied to the corner of one of the fabrics. If the fabrics do not separate in 60 seconds, they are rated as blocked. If the fabrics separate in under 60 seconds, they pass the blocking test (rated IS in Table 1).

The fabrics top coated with the anti-blocking coating of Example 1, and three control samples having no top coat, were also tested in a burn test in which a flame was applied to the edge of the fabric and the distance of burning and time of burning were measured. All the fabric samples were self-extinguishing (SE), most immediately on removal of the flame.

TABLE 1

| Top coat weight | Blocking | Burn distance mm | Burn rate seconds | SE or burn |
|---|---|---|---|---|
| 5.0 | IS | 0 | 0 | SE |
| 1.0 | IS | 0 | 0 | SE |
| 1.5 | IS | 3 | 3 | SE |
| 2.2 | IS | 0 | 0 | SE |
| 3.4 | IS | 0 | 0 | SE |
| 3.2 | IS | 0 | 0 | SE |
| 5.5 | IS | 0 | 0 | SE |
| 4.3 | IS | 0 | 0 | SE |
| 1.8 | IS | 0 | 0 | SE |
| 2.4 | IS | 0 | 0 | SE |
| 1.8 | IS | 0 | 0 | SE |
| 1.0 | IS | 0 | 0 | SE |
| 3.6 | IS | 0 | 0 | SE |
| 3.8 | IS | 6 | 8 | SE |
| 2.6 | IS | 0 | 0 | SE |
| 3.4 | IS | 0 | 0 | SE |
| 0 | Block | 0 | 0 | SE |
| 0 | Block | 0 | 0 | SE |
| 0 | Block | 0 | 0 | SE |

We claim:

1. An air bag having a cured coating comprising an organic resin, characterized in that the air bag is top coated with an anti-blocking coating comprising at least one solid lubricant dispersed in an organic polymer binder, wherein the at least one solid lubricant comprises talc and the organic polymer binder consists of a polyurethane binder or consists of a polyurethane binder and another organic polymer binder selected from the group consisting of a phenolic resin binder, an epoxy resin binder, an acrylic resin binder, a polyester resin binder, an amino-formaldehyde resin binder, a vinyl resin binder and combinations thereof, and wherein the anti-blocking coating comprises 30 to 75% solid lubricant on a dry weight basis and comprises 3 to 50% organic polymer binder on a dry weight basis.

2. An air bag according to claim 1, wherein the dispersed solid lubricant comprises a fluoropolymer.

3. An air bag according to claim 2, wherein the dispersed solid lubricant comprises polytetrafluoroethylene.

4. An air bag according to claim 1, wherein the anti-blocking coating contains 5 to 55% by weight aluminum trihydrate as flame retardant.

5. An air bag according to claim 1, wherein the coating weight of the anti-blocking coating is 1 to 15 g/m2 on a dry coat weight basis.

6. An air bag according process according to claim 1 wherein the anti-blocking coating contains a wetting agent comprising a siloxane polyether having 1-3 alkylpoly(ethyleneoxy)siloxane groups (i) and 1 to 4 alkyl-siloxane groups (ii).

7. A process for coating an air bag or air bag fabric in which the bag or fabric is coated with an organic resin composition, wherein the air bag is top coated with an anti-blocking coating composition comprising an aqueous dispersion of at least one dispersed solid lubricant, wherein the at least one dispersed solid lubricant comprises talc and the aqueous dispersion consists of a polyurethane binder or consists of a polyurethane binder and another organic polymer binder selected from the group consisting of a phenolic resin binder, an epoxy resin binder, an acrylic resin binder, a polyester resin binder, an amino-formaldehyde resin binder, a vinyl resin binder and combinations thereof, and wherein the anti-blocking coating comprises 30 to 75% solid lubricant on a dry weight basis and comprises 3 to 50% organic polymer binder on a dry weight basis.

8. A process according to claim 7 wherein the at least one dispersed solid lubricant comprises a solid fluoropolymer.

9. A process according to claim 8 wherein the at least one dispersed solid lubricant comprises polytetrafluoroethylene.

10. A process according to claim 7 wherein the organic resin composition comprises a urethane polymer.

11. A process according to claim 10, wherein the organic resin composition comprises a hybrid resin of a urethane polymer blended with an acrylate or vinyl resin, where at least one of the components of the hybrid resin has a glass transition temperature of 20° C. or less.

* * * * *